United States Patent
Seong et al.

(10) Patent No.: US 9,531,272 B2
(45) Date of Patent: Dec. 27, 2016

(54) TWO-PHASE INTERLEAVED CONVERTER AND METHOD OF CONTROLLING THE SAME

(71) Applicant: Hyundai Motor Company, Seoul (KR)

(72) Inventors: Hyun Wook Seong, Gyeonggi-Do (KR); Mu Shin Kwak, Gyeonggi-Do (KR); Shin Hye Chun, Jeollanam-Do (KR); Hui Sung Jang, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 134 days.

(21) Appl. No.: 14/510,679

(22) Filed: Oct. 9, 2014

(65) Prior Publication Data

US 2015/0146467 A1 May 28, 2015

(30) Foreign Application Priority Data

Nov. 26, 2013 (KR) .......................... 10-2013-0144335

(51) Int. Cl.
*G05F 1/00* (2006.01)
*H02M 3/158* (2006.01)

(52) U.S. Cl.
CPC ... *H02M 3/1584* (2013.01); *H02M 2003/1586* (2013.01)

(58) Field of Classification Search
CPC .................. H02M 3/1584; H02M 2003/1586; H02M 3/156
USPC ............................ 323/272, 282; 363/65, 69
See application file for complete search history.

(56) References Cited

U.S. PATENT DOCUMENTS

| 6,009,000 A | 12/1999 | Siri |
| 7,095,216 B2 | 8/2006 | Matsuo et al. |
| 7,342,383 B1 * | 3/2008 | Song ................... H02M 3/1584 323/222 |

(Continued)

FOREIGN PATENT DOCUMENTS

| JP | 2001-078449 A | 3/2001 |
| JP | 2011-151949 A | 8/2011 |

(Continued)

OTHER PUBLICATIONS

Development of 8kW ZVZCS Full Bridge DC-DC Converter by Parallel Operation, pp. 400-408, dated Oct. 5, 2007.

*Primary Examiner* — Adolf Berhane
*Assistant Examiner* — Alex Torres-Rivera
(74) *Attorney, Agent, or Firm* — Mintz Levin Cohn Ferris Glovsky and Popeo, P.C.; Peter F. Corless

(57) ABSTRACT

A two-phase interleaved converter includes two sub-circuits, a voltage controller, a current controller, a balancing controller and a phase shifter. The voltage controller receives the output voltage of the two sub-circuits and outputs a signal in proportion to the level of the output voltage. The current controller receives the output signal of the voltage controller and an inductor current from one of the two sub-circuits and outputs a control signal that controls one of the two sub-circuits which is in charge of one phase. The balancing controller receives values of currents output from the two sub-circuits and calculates a difference between the values of the currents output from the two sub-circuits to control a duty ratio of the control signal applied to one of the two sub-circuits. The phase shifter shifts a phase of the control signal output from the balancing controller.

12 Claims, 11 Drawing Sheets

(56) References Cited

U.S. PATENT DOCUMENTS

| | | | | |
|---|---|---|---|---|
| 2005/0036337 A1* | 2/2005 | Zhang | ................ | H02M 3/1584 363/17 |
| 2008/0129260 A1* | 6/2008 | Abu Qahouq | ...... | H02M 3/1584 323/272 |
| 2011/0133704 A1* | 6/2011 | Zambetti | ............ | H02M 3/1584 323/212 |
| 2013/0194848 A1 | 8/2013 | Bernardinis et al. | | |
| 2013/0320951 A1* | 12/2013 | Wu | .................... | H02M 3/1584 323/311 |

FOREIGN PATENT DOCUMENTS

| | | |
|---|---|---|
| JP | 2012-210145 A | 10/2012 |
| KR | 10-2013-0090678 | 8/2013 |

* cited by examiner

TWO-PHASE INTERLEAVED CONVERTER AND METHOD OF CONTROLLING THE SAME

CROSS-REFERENCE TO RELATED APPLICATION

This application claims under 35 U.S.C. §119(a) the benefit of Korean Patent Application No. 10-2013-0144335 filed on Nov. 26, 2013, the entire contents of which are incorporated herein by reference.

BACKGROUND (a) Technical Field

The present invention relates to a two-phase interleaved converter and a method of controlling the same.

(b) Background Art

An interleaved converter is well understood to be a converter which can reduce a current ripple amplitude (usually the entire ripple) by applying an offset effect between currents which is caused due to the current distribution and the phase differences due to the number of distributed currents. Additionally, interleaved converters advantageously are able to reduce the capacities and volumes of input and output filters.

FIGS. 1 and 2 are circuit diagrams illustrating a current control scheme of an interleaved converter according to the related art. The interleaved converter of FIG. 1 is a two-phase interleaved converter 10 which converts the input voltage Vin from the input voltage source 30 into an output voltage. An interleave controller 20 for controlling converters of each phase includes current controllers corresponding to each phase. That is, an A-phase current controller 21 for controlling an A-phase current is provided in an A-phase sub-circuit 11 and a B-phase control controller 22 for controlling a B phase current is provided in a B-phase sub-circuit 12.

In such an interleaved converter, a voltage of an output capacitor 40 is measured by a voltage controller 23 and provided to each current controller. The current controller for each phase generates duty ratios for controlling each phase and transfers the duty ratios to the interleaved converter, so that the current output from the converter is controlled. Thus, although the current controllers for controlling each phase are provided so the inductor currents can be balanced, the load factor of a microcomputer is increased. The inductor currents are currents output by the current controllers for controlling each phase.

FIG. 2 is a circuit diagram showing an interleaved converter having a single current controller according to the related art. The interleaved converter of FIG. 2 is a two-phase interleaved converter 10 which converts the input voltage from the input voltage source 30 into an output voltage. An interleave controller 20 for controlling converters of each phase includes a single current controller 21.

In addition, the signal output from the single current controller 21 is phase-shifted to control another phase interleaved converter. That is, when the interleaved converter controls currents of A and B phases and the control controller 21 controls the A phase converter, the B phase converter 12 is controlled with the signal which is generated by phase-shifting the signal output from the A phase current controller by 180° through a phase shifter 24. In other words, one current controller is used to generate a signal having a duty ratio that controls a current in one phase and a current in another phase is controlled by a signal which has the same duty ratio and is obtained by shifting the signal for controlling the current in the one phase by 180°.

Although the above-described scheme has an advantage of reducing an amount of load of the microcomputer, it is difficult to reflect instantly and exactly the variation of the current in another phase so that a current imbalance may occur.

SUMMARY OF THE DISCLOSURE

The present invention has been made in an effort to solve the above-described problems associated with prior art. An object of the present invention is to provide a two-phase interleaved converter capable of effectively protecting a power device from the imbalance between phase currents which may occurs in the two-phase interleaved converter.

Another object of the present invention is to provide a two-phase interleaved converter including a current controller and a balance controller which can solve the imbalance between phase currents and in addition, can reduce the load on a microcomputer by simplifying the calculation process through the current controller and the balance controller.

In order to achieve the above objects, a two-phase interleaved converter according to one aspect of the present invention includes two sub-circuits including inputs which are connected in parallel to each other and outputs which are connected in parallel to each other in order to convert a direct current (DC) or an alternating current (AC input voltage into a output voltage having a level different from a level of the input voltage. Also included is a voltage controller that is configured to receive the output voltage of the two sub-circuits and output a signal in proportion to the level of the output voltage, and a current controller configured to receive the output signal of the voltage controller and an inductor current from one of the two sub-circuits and to output a control signal for controlling one of the two sub-circuits which is in charge of one phase. Furthermore, the two-phase interleaved converter includes a balancing controller that is configured to receive values of currents output from the two sub-circuits and to calculate a difference between the values of the currents output from the two sub-circuits to control a duty ratio of the control signal applied to one of the two sub-circuits. A phase shifter is also included which is configured to shift a phase of the control signal output from the balancing controller. More specifically, one of the two sub-circuits directly receives the control signal output from the balancing controller, and a remaining sub-circuit receives the phase-shifted control signal from the phase shifter.

In the exemplary embodiment of the present invention, the balancing controller may reduce the duty ratio of the control signal applied to one of the two sub-circuits when the inductor current of the one sub-circuit is greater than an inductor current of the remaining sub-circuit, and increase the duty ratio of the control signal applied to one of the two sub-circuits when the inductor current of the one sub-circuit is less than an inductor current of the remaining sub-circuit.

Furthermore, the phase shifter may be configured to shift the phase of the control signal output from the balancing controller by 180°.

The balancing controller, in some exemplary embodiments of the present invention may be configured to subtract a value of the inductor current of one sub-circuit from a value of the inductor current of a remaining sub-circuit to obtain a difference value, integrate the difference value to obtain a duty-ratio difference value, multiple the duty ratio of the control signal output from the current controller by a value which is obtained by subtracting the duty-ratio difference value from '1' in order to apply a multiplying result to one of the two sub-circuits as the control signal, and multiply the duty ratio of the control signal output from the current controller by a value which is obtained by adding the duty-ratio difference value to '1' in order to apply a multiplying result to a remaining sub-circuit as the control signal.

The balancing controller may also or alternatively be configured to subtract a value of the inductor current of one sub-circuit from a value of the inductor current of a remaining sub-circuit to obtain a difference value, amplify the difference value at one predetermined amplifying ratio, add a value which is obtained by integrating the amplified value at the one predetermined amplifying ratio to a value amplified at another predetermined amplifying ratio in order to obtain a duty-ratio difference value, multiply the duty ratio of the control signal output from the current controller by a value which is obtained by subtracting the duty-ratio difference value from '1' in order to apply a multiplying result to one of the two sub-circuits as the control signal, and multiply the duty ratio of the control signal output from the current controller by a value which is obtained by adding the duty-ratio difference value to '1' in order to apply a multiplying result to a remaining sub-circuit as the control signal.

According to another aspect of the present invention, a method of controlling a two-phase interleaved converter may include sensing inductor current values of two sub-circuits of the two-phase interleaved converter; calculating, by a controller, a difference between the inductor currents of the two sub-circuits; and increasing a duty ratio of a control signal applied to one of the two sub-circuits when one inductor current value of the one sub-circuit is less than a remaining inductor current value of a remaining sub-circuit.

According to still another aspect of the present invention, a method of controlling a two-phase interleaved converter may include sensing inductor current values of two sub-circuits of the two-phase interleaved converter; calculating a difference between the inductor currents of the two sub-circuits; and reducing a duty ratio of a control signal applied to one of the two sub-circuits when one inductor current value of the one sub-circuit is greater than a remaining inductor current value of a remaining sub-circuit.

As described above, the two-phase interleaved converter according to the present invention has the following advantages.

First, a load on a microcomputer can be reduced, so that a high-priced microcomputer can be replaced with a low-priced microcomputer, thereby reducing the fabrication cost. Second, imbalance between phase currents can be solved by using the current difference between the sub-circuits. Thus, an over-current can be prevented from flowing through a power device of the converter, so that the performance and reliability of the two-phase interleaved converter may be obtained. Third, the inductor currents of the sub-circuits for each phase can be maintained in an equilibrium state, so that the ripples of the inductor currents can be reduced.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
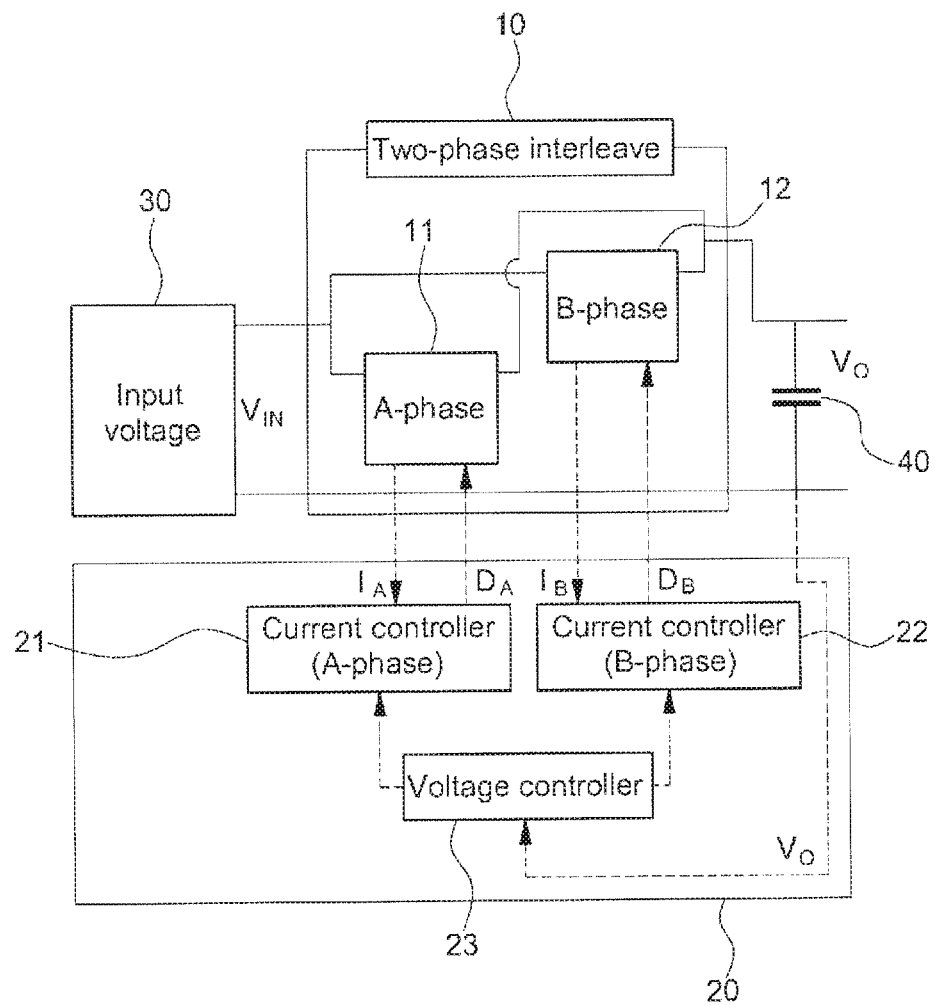
FIG. 1 is a circuit diagram showing one current control scheme of an interleaved converter according to the related art.
Figure 2:
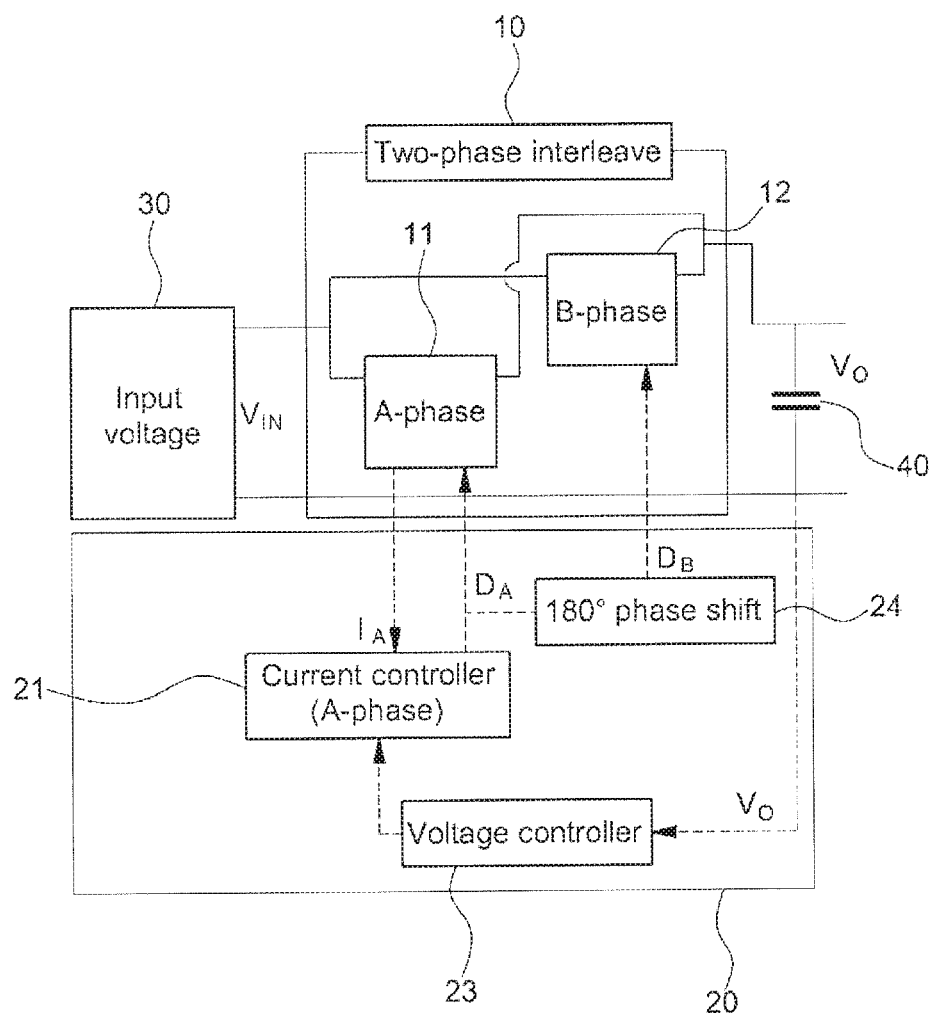
FIG. 2 is a circuit diagram showing another current control scheme of an interleaved converter according to the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a preferable embodiment of the present invention will be described in detail with reference to accompanying drawings. The present invention can be various modified and have various embodiments. Accordingly, specific embodiments are illustrated in drawings and will be described in detail. However, it should be understood to those skilled in the art that the present invention is not limited to the specific embodiment, but includes all modifications, equivalents, and alternatives of the specific embodiment within the spirit and the technical scope of the present invention.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 3:
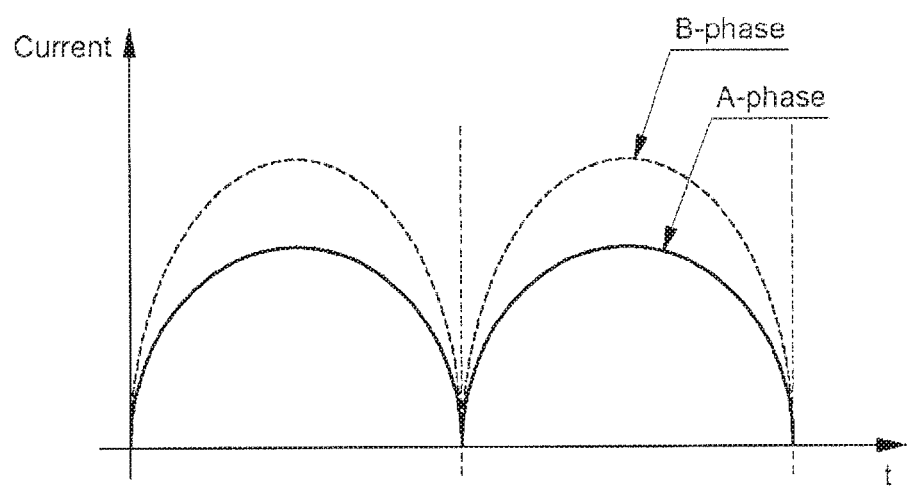
FIG. 3 is a graph showing comparison results of the current values output from each sub-module of a two-phase interleaved converter.

FIG. 3 is a graph showing comparison results of the current values output from each sub-module of a two-phase interleaved converter. In a two-phase interleaved converter according to an exemplary embodiment of the present invention, a sub-circuit may be called each branch which is in charge of an A or B phase. In addition, such a branch may be implemented in a half or full bridge by using a semiconductor switching device.

However, since the two-phase interleaved converter according to an exemplary embodiment of the present invention is focused on a circuit driving topology rather than a circuit topology, it should be kept in mind that any types of circuits utilizable in the related art may be usable.

As can be seen from FIG. 3 that the inductor current of a B-phase sub-circuit taking charge of B-phase is greater than the output current of an A-phase sub-circuit taking charge of A-phase. In fact, in FIG. 3, although the phase of the inductor current output from the B-phase sub-circuit should be delayed by 180° to the inductor current of the A-phase sub-circuit, the inductor currents having the same phase have been shown in FIG. 3 in order to effectively compare the values of the inductor currents output from the sub-circuits with each other.

In this case, if the inductor current output from the B-phase sub-circuit is greater than that of the A-phase sub-circuit, a power element such as an IGBT (Insulated Gate Bipolar Transistor) used in the B-phase sub-circuit as a semiconductor switching device handles a much greater current therethrough. As such, the power element becomes over-loaded. In addition, since the difference between the inductor currents output from the A-phase and B-phase sub-circuits is significant, the ripple of the entire output current is increased.

To improve this phenomenon, the duty ratio of the control signal for controlling the A-phase sub-circuit is increased and the duty ratio of the control signal for controlling the B-phase sub-circuit is reduced.

Figure 4:
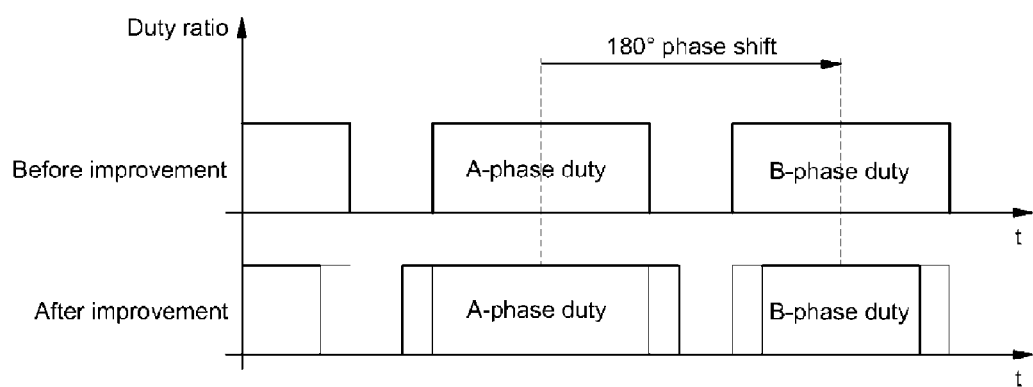
FIG. 4 is a view illustrating a duty ratio control of the control signals applied to each sub-circuit of the two-phase interleaved converter according to an exemplary embodiment of the present invention.

FIG. 4 is a view illustrating a duty ratio control of the control signals applied to each sub-circuit of the two-phase interleaved converter according to an exemplary embodiment of the present invention. Before improving, it can be confirmed that the duty ratio of the control signal applied to the A-phase sub-circuit is the same as that of the control signal applied to the A-phase sub-circuit. The phase difference between the control signals of the A-phase and B-phase sub-circuits is only 180°.

In order to improve the current imbalance state that a much greater current flows through the B-phase sub-circuit, the duty ratio of the control signal applied to the A-phase sub-circuit is increased and the duty ratio of the control signal applied to the B-phase sub-circuit is reduced. That is, the semiconductor device of the A-phase sub-circuit is turned on for a longer period of time than the current controller's duty in FIG. 9 and the semiconductor device of the B-phase sub-circuit is turned on for a shorter period of time than the current controller's duty in FIG. 9.

Figure 5:
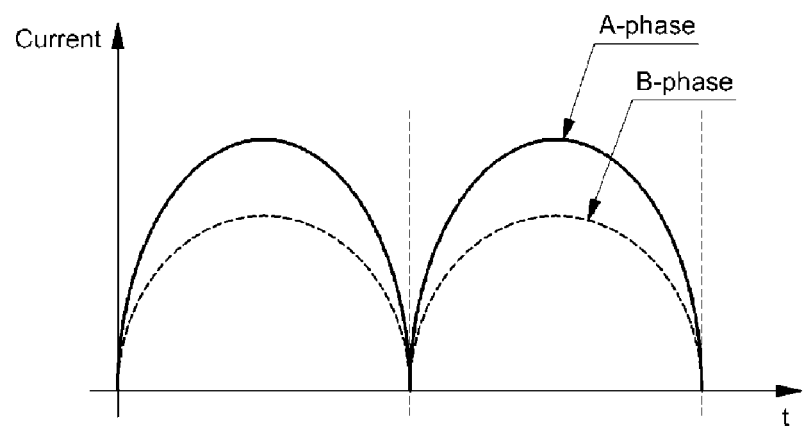
FIG. 5 is a view illustrating the fact that the current output from the A-phase sub-circuit is greater than the current output from the B-phase sub-circuit in accordance with the exemplary embodiments of the present invention.

Differently from FIG. 4, FIG. 5 is a view illustrating the current output from the A-phase sub-circuit is greater than the current output from the B-phase sub-circuit.

Although the currents having the same phase have been shown in FIG. 5 in order to compare the amplitudes of the currents output from each phase sub-circuits with each other, the phase of the current output from the B-phase sub-circuit may be delayed by 180° compared to the current of the A-phase sub-circuit. Accordingly, as shown in FIG. 5, since the current output from the A-phase sub-circuit is greater than the current output from the B-phase sub-circuit, it may be known that the currents are currently unbalanced.

Figure 6:
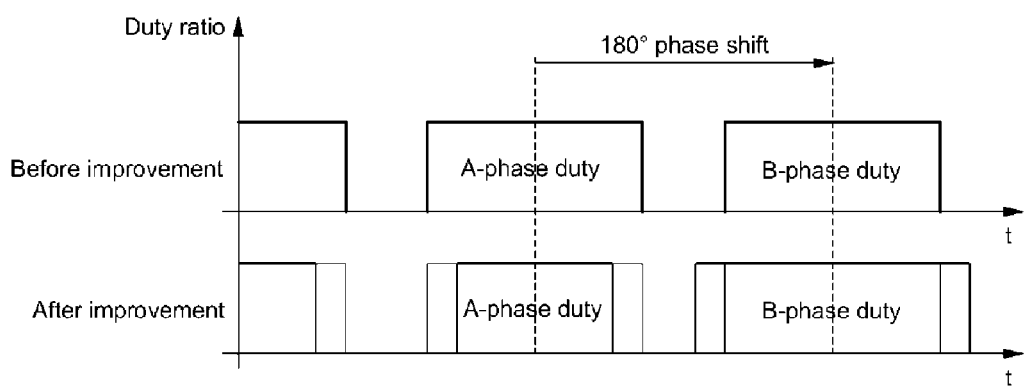
FIG. 6 is a view illustrating an adjustment of the control signals applied to each sub-circuit to change the current imbalance state into a current balance state in accordance with the exemplary embodiments of the present invention.

FIG. 6 is a view illustrating an adjustment of the control signals applied to each sub-circuit to change the current imbalance state into a current balance state. Before the improvement, the duty ratio of the current signal applied to the A-phase is equal to the duty ratio of the current signal applied to the B-phase sub-circuit. Additionally, the phase difference between the control signals of the A-phase and B-phase sub-circuits is only 180°.

Thus, since the A-phase sub-circuit outputs a current greater than that of the B-phase sub-circuit, the duty ratio of the control signal applied to the A-phase sub-circuit is reduced and the duty ratio of the control signal applied to the B-phase sub-circuit. That is, contrary to that depicted in FIG. 4, the semiconductor switching device of the A-phase sub-circuit is turned on for a shorter time and the semiconductor switching device of the B-phase sub-circuit is turned on for a longer time than the currently driving time.

FIG. 6 shows the control signal having the adjusted duty ratio after the improvement. It can be confirmed that the duty ratio of the control signal applied to the A-phase sub-circuit is reduced and the duty ratio of the control signal applied to the B-phase sub-circuit is increased.

Figure 7:
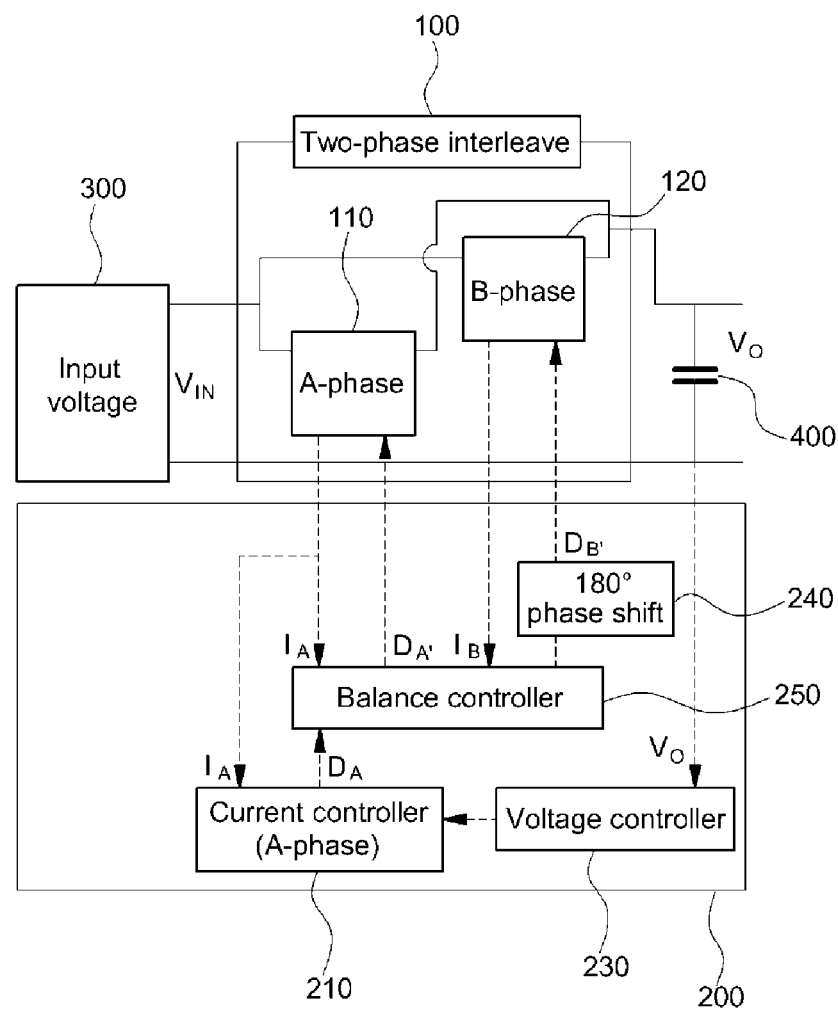
FIG. 7 is a circuit diagram showing in detail a two-phase interleaved converter implemented according to an exemplary embodiment of the present invention.

FIG. 7 is a circuit diagram showing in detail a two-phase interleaved converter implemented according to exemplary embodiment of the present invention. The two-phase interleaved converter according to an exemplary embodiment of the present invention may include a circuit topology 100 implemented in a two-phase interleaving scheme, an interleave controller 200, an input voltage Vin source 300 and an output capacitor 400.

The circuit topology 100 of the two-phase interleaved converter according to an exemplary embodiment of the present invention may more specifically include an A-phase sub-circuit 110 and a B-phase sub-circuit 120.

The interleave controller 200, which applies the sub-circuits to the sub-circuits, may include a voltage controller 230, a current controller 210 and a balance controller 250 and a phase shifter 240. The voltage controller 230 may measure an output voltage Vo of the output capacitor and may transfer the result to the current controller 210. The current controller 210 may receive an output value from the voltage controller 230 and the inductor current of one of the sub-circuits to generate and output a control signal. For example, the current controller 210 may be configured to receive the current $I_A$ output from the A-phase sub-circuit to generate a signal for controlling the A-phase sub-circuit. In particular, the balance controller 250 may adjust a duty ratio of the control signal $D_A$ output from the current controller 210. To this end, the balance controller 250 may receive the current value $I_A$ output from the A-phase sub-circuit and the inductor current $I_B$ output from the B-phase sub-circuit to calculate the difference between them.

Based on the difference, the balance controller 250 may adjust the duty ratio $D_A$ of the control signal required to drive the A-phase sub-circuit into $D_A'$ and the duty ratio $D_B$ of the control signal required to drive the B-phase sub-circuit into $D_B'$. In addition, after the control signal having the adjusted duty ratio $D_B'$ is phase-shifted by 180°, the phase-shifted control signal may be applied to the B-phase sub-circuit.

Figure 8:
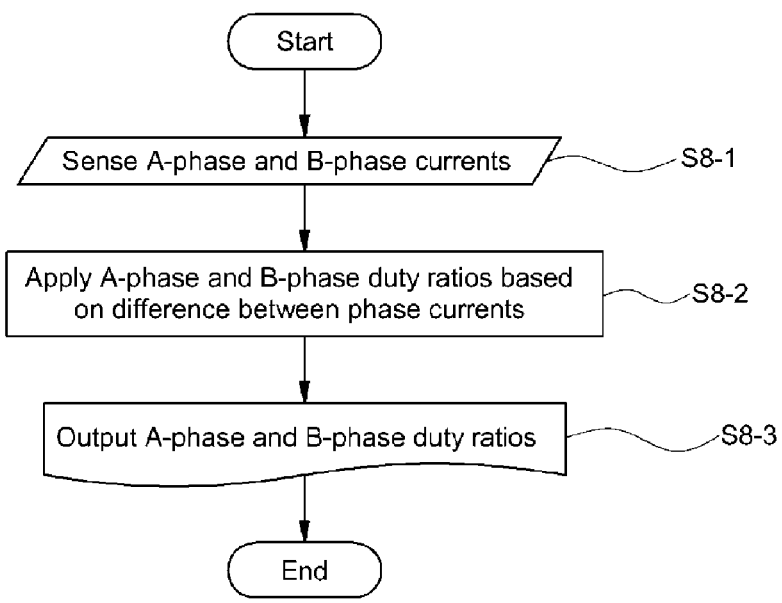
FIG. 8 is a flowchart illustrating a process of adjusting the duty ratio of the control signal applied to the two-phase interleaved converter according to exemplary embodiment of the present invention.

FIG. 8 is a flowchart illustrating a process of adjusting the duty ratio of the control signal applied to the two-phase interleaved converter according to an exemplary embodiment of the present invention. In step S8-1, the two-phase interleaved converter according to an exemplary embodiment of the present invention senses the currents output from the A-phase and B-phase sub-circuits. In step S8-2, the two-phase interleaved converter calculates the difference between the currents and generates control signals having mutually different duty ratios based on the difference. In the step S8-3, the two-phase interleaved converter applies the control signals to the A-phase and B-phase sub-circuits, respectively.

Figure 9:
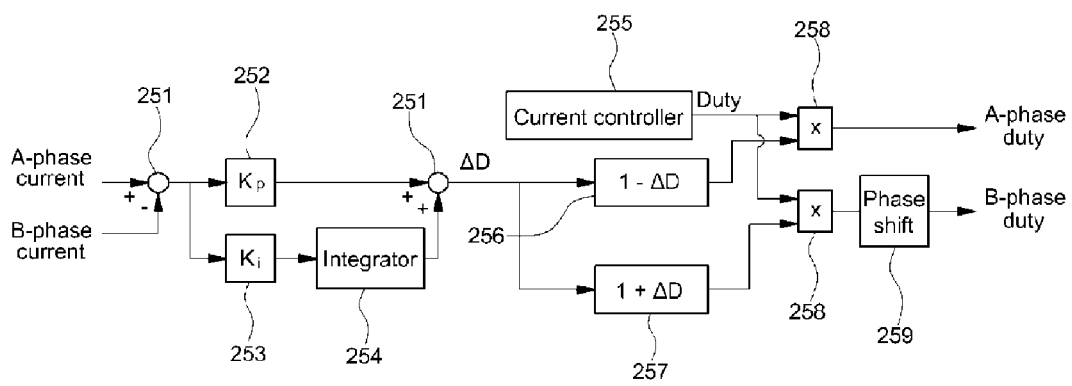
FIG. 9 is a circuit diagram showing an inner configuration of the balance controller in the two-phase interleaved converter according to an exemplary embodiment of the present invention.

FIG. 9 is a circuit diagram showing an inner configuration of the balance controller 250 in the two-phase interleaved converter according to an exemplary embodiment of the present invention. The balance controller 250 receives the A-phase current and the B-phase current. The difference between the A-phase and B-phase currents may be obtained by subtracting the B-phase current from the A-phase current. This calculation may be performed by using an adder 251.

Next, the difference between the A-phase and B-phase currents are amplified at predetermined amplifying ratios. For example, the difference may be amplified at gain values $K_P$ and $K_i$. That is, the amplifications may be performed by using an amplifier 252 having the gain $K_P$ and an amplifier 253 having the gain $K_i$. One of the amplified signals may be integrated by using an integrator 254. For example, as shown in FIG. 9, the signal amplified at $K_i$ is amplified by an amplifier. The difference value $\Delta D$ between the duty ratios, which are adjusted, may be obtained by adding one of the signals amplified at the predetermined gains to the signal obtained by integrating the remaining signal.

Next, the duty ratios may be suitably adjusted based on $\Delta D$. That is, one signal may be adjusted with $(1- \Delta D)$ and the other signal may be adjusted with $(1+ \Delta D)$. The block of performing the above operations may be called duty controllers 256 and 257. Then, a multiplier 258 may multiply the signals and the signal output from the current controller 255, such that the duty ratios of the control signals required to drive the A-phase and B-phase sub-circuits are adjusted.

Differently from the driving signal for driving the A-phase sub-circuit, the driving signal for driving the B-phase sub-circuit is phase-shifted through the phase shifter 259 and the phase shifted signal is applied to the semiconductor switching device of the B-phase sub-circuit. That is, after the signal is delayed by 180°, the signal may be applied to the B-phase sub-circuit.

Although it is shown in FIG. 9 that the phase shifter 259 is included in the balance controller 250, there is no need to allow the phase shifter 259 to be included in the balance controller 250. That is, the phase shifter 259 may be implemented at an outside of the balance controller 250. Therefore, when the phase shifter 259 is included in the balance controller 250, the phase shifter 258 implemented at an outside of the balance controller 250 may be omitted. To the contrary, when the phase shifter 259 is implemented at an outside of the balance controller 250, the phase shifter 259 implemented in the balance controller 250 may be omitted.

Figure 10:
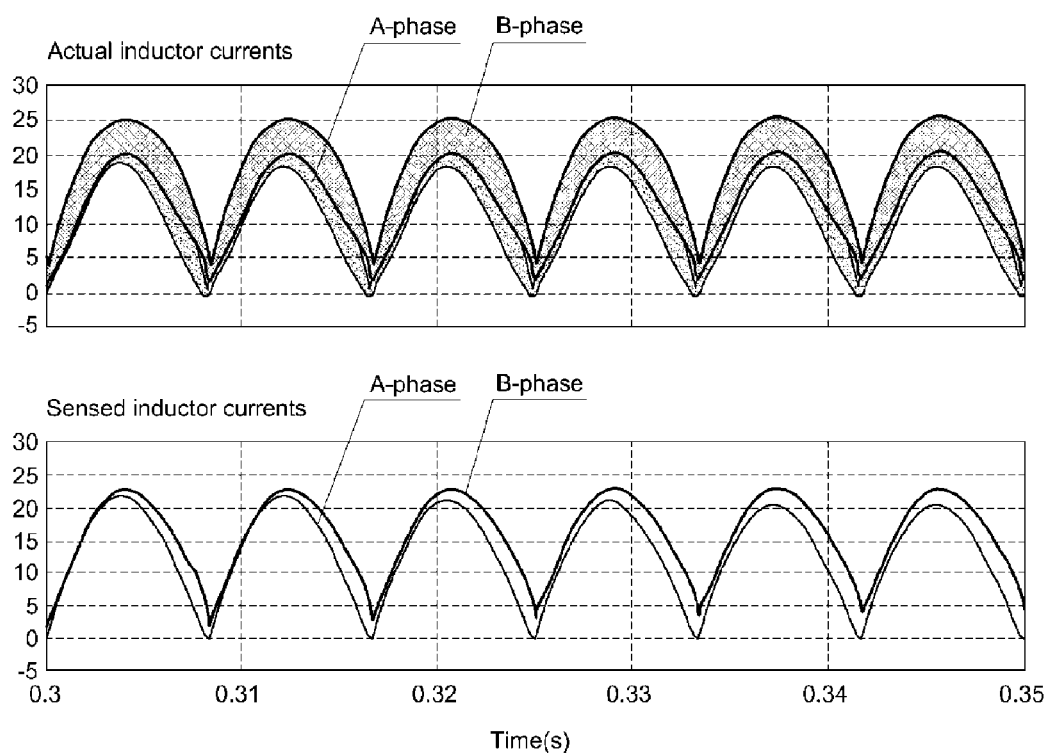
FIG. 10 is graphs showing the inductor currents of each phase before applying the two-phase interleaved converter, that is, in a state that the balance controller 250 is not implemented in the two-phase interleaved converter according to an exemplary embodiment of the present invention.
Figure 11:
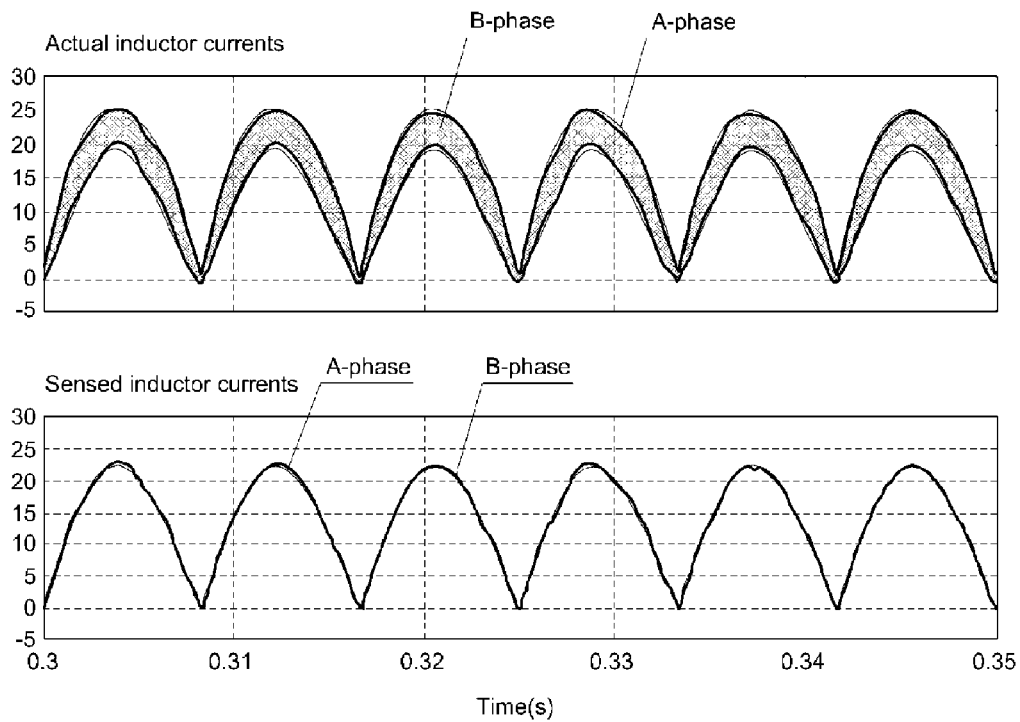
FIG. 11 is graphs showing the results of measuring the current output from the two-phase interleaved convert to which the balance controller 250 is applied according to an exemplary embodiment of the present invention.

FIGS. 10 and 11 are views illustrating comparison of the inductor current values before and after applying the two-phase interleaved converter according to an exemplary embodiment of the present invention. FIG. 10 is graphs showing the inductor currents of each phase before applying the two-phase interleaved converter, that is, in a state that the balance controller 250 is not implemented in the two-phase interleaved converter according to an exemplary embodiment of the present invention.

The graph shows the A-phase inductor current and B-phase inductor current. It can be confirmed from the drawings that the imbalance between the phase currents occur in the current actually flowing through an inductor or the sensed current.

FIG. 11 is graphs showing the results of measuring the current output from the two-phase interleaved convert to which the balance controller 250 is applied according to an exemplary embodiment of the present invention. Also, this graph shows the A-phase inductor current, graph shows the B-phase inductor current as different shades.

Figure 12:
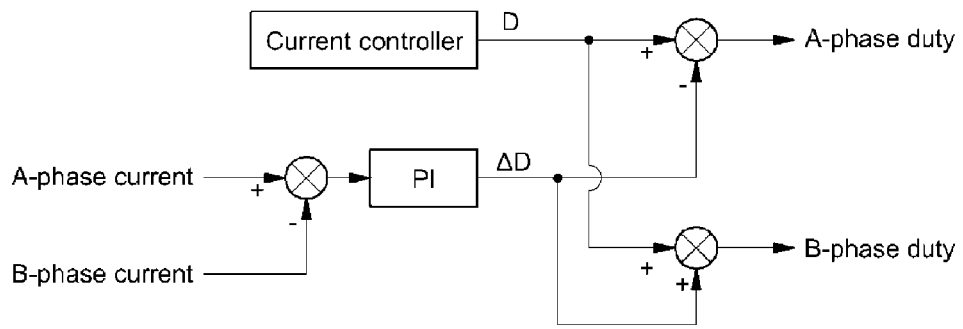
FIG. 12 is a circuit diagram showing the internal control blocks of a conventional two-phase interleaved converter in which the balance controller of the two-phase interleaved converter according to an exemplary embodiment of the present invention is not included.

Differently from FIG. 10, it may be confirmed from FIG. 11 that the waveforms of the A-phase and B-phase inductor currents are equal to each other. FIGS. 12 to 15 are views showing the results of comparing effects of the two-phase interleaved converter with each other in another aspect. FIG. 12 is a circuit diagram showing the internal control blocks of a conventional two-phase interleaved converter in which the balance controller 250 of the two-phase interleaved converter according to an exemplary embodiment of the present invention is not included.

Figure 13:
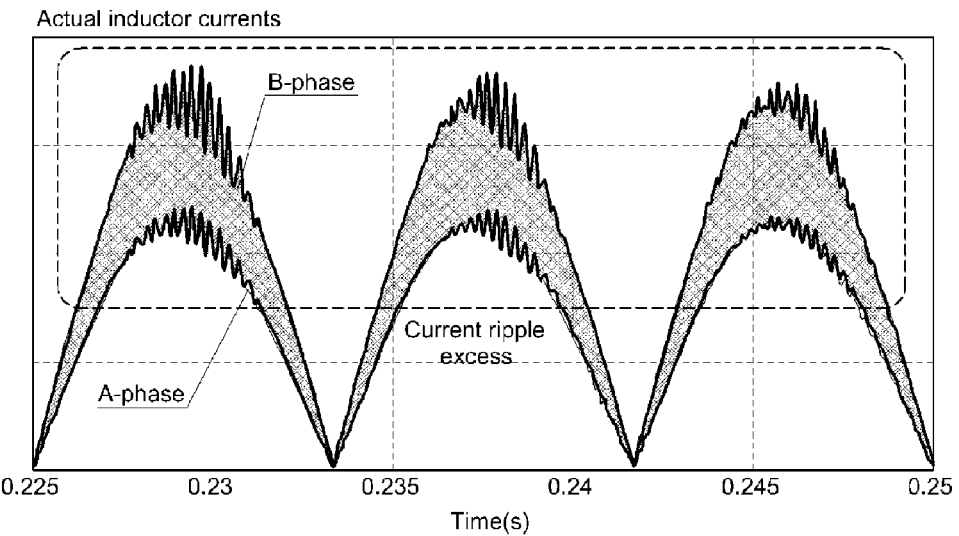
FIG. 13 is a view showing a waveform of an inductor current of the two-phase interleaved converter of FIG. 12.

FIG. 13 is a view showing a waveform of an inductor current of the two-phase interleaved converter of FIG. 12. It may be confirmed from FIG. 13 that excessive ripples are formed in the output waveform when the PI integrator is applied without the balance controller 250.

Figure 14:
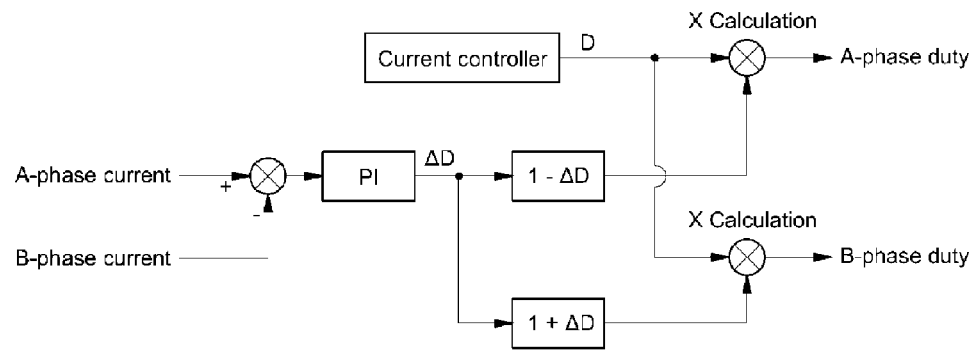
FIG. 14 is a circuit diagram showing a case of applying the balance controller in accordance with the exemplary embodiments of the present invention.

FIG. 14 is a circuit diagram showing a case of applying the balance controller 250. As shown in FIG. 14, the duty ratio is obtained by integrating the difference between the A-phase and B-phase outputs and in addition, the duty ratio is adjusted by applying the duty ratio to the previous control signal.

Figure 15:
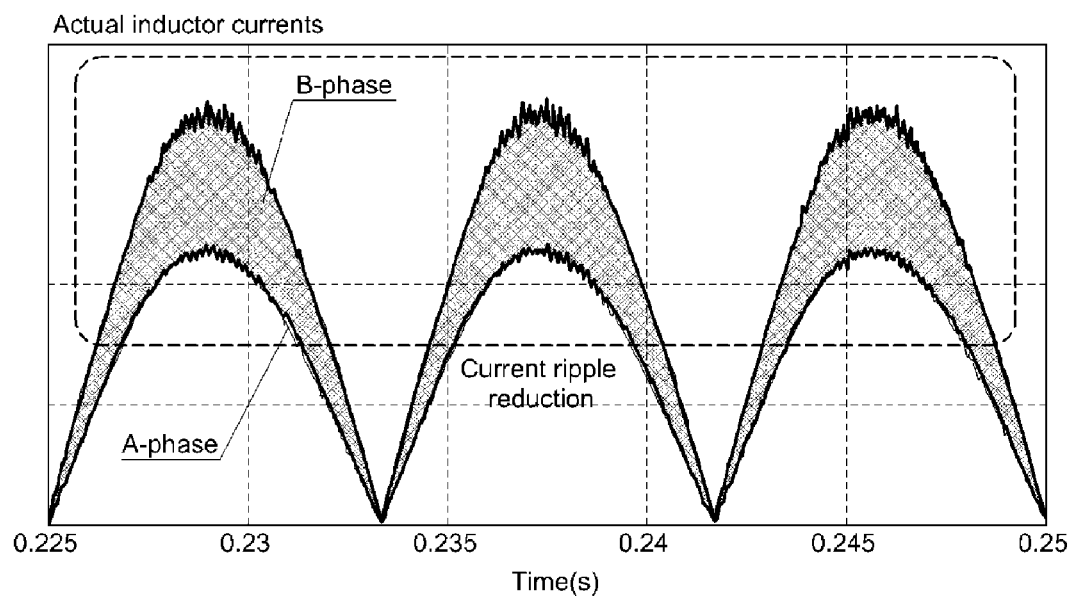
FIG. 15 is a view showing a waveform output from the two-phase interleaved converter of FIG. 14.

FIG. 15 is a view showing a waveform output from the two-phase interleaved converter of FIG. 14. Differently from FIG. 13, FIG. 15 shows the fact that the current ripple is certainly reduced output from the two-phase interleaved converter according to an exemplary embodiment of the present invention.

As described above, the present invention has been described in detail with reference to preferred embodiments thereof. However, it will be appreciated by those skilled in the art that changes and modifications may be made in these embodiments without departing from the principles and spirit of the invention, the scope of which is defined in the appended claims and their equivalents.

What is claimed is:

1. A two-phase interleaved converter comprising:
two sub-circuits including inputs which are connected in parallel to each other and outputs which are connected in parallel to each other in order to convert a direct current (DC) or an alternating current (AC) input voltage into a DC output voltage having a level different from a level of the input voltage;
a voltage controller configured to receive the DC output voltage of the two sub-circuits and output a current reference signal;
a current controller configured to receive the current reference signal output by the voltage controller and an inductor current from one of the two sub-circuits and to output a control signal;
a balancing controller configured to receive values of currents output from the two sub-circuits and to calculate a difference between the values of the currents output from the two sub-circuits in order to control a duty ratio of the control signal output from the current controller, and configured to output a first and second control signals in which the duty ratio is controlled; and
a phase shifter configured to shift a phase of the second control signal output from the balancing controller and output a phase-shifted control signal,
wherein one of the two sub-circuits directly receives the first control signal output from the balancing controller, and a remaining sub-circuit receives the phase-shifted control signal from the phase shifter, and
wherein the balancing controller is further configured to:
subtract a value of the inductor current of the one sub-circuit from a value of the inductor current of the remaining sub-circuit to obtain a difference value,
integrate the difference value to obtain a duty-ratio difference value,
multiply the duty ratio of the control signal output from the current controller by a value which is obtained by subtracting the duty-ratio difference value from '1' in order to apply a multiplying result to the one sub-circuit as the first control signal output from the balancing controller, and
multiply the duty ratio of the control signal output from the current controller by a value which is obtained by adding the duty-ratio difference value to '1' in order to apply a multiplying result to the remaining sub-circuit as the second control signal output from the balancing controller.

2. The two-phase interleaved converter of claim 1, wherein the balancing controller reduces the duty ratio of the first control signal applied to the one sub-circuit when the inductor current of the one sub-circuit is greater than an inductor current of the remaining sub-circuit.

3. The two-phase interleaved converter of claim 1, wherein the balancing controller increases the duty ratio of the first control signal applied to the one sub-circuit when the inductor current of the one sub-circuit is less than an inductor current of the remaining sub-circuit.

4. The two-phase interleaved converter of claim 1, wherein the phase shifter shifts the phase of the second control signal output from the balancing controller by 180°.

5. A two-phase interleaved converter comprising:
two sub-circuits including inputs which are connected in parallel to each other and outputs which are connected in parallel to each other in order to convert a direct current (DC) or an alternating current (AC) input voltage into a DC output voltage having a level different from a level of the input voltage;
a voltage controller configured to receive the DC output voltage of the two sub-circuits and output a current reference signal;
a current controller configured to receive the current reference signal output by the voltage controller and an inductor current from one of the two sub-circuits and to output a control signal;
a balancing controller configured to receive values of currents output from the two sub-circuits and to calculate a difference between the values of the currents output from the two sub-circuits in order to control a duty ratio of the control signal output from the current controller, and configured to output first and second control signals in which the duty ratio is controlled; and
a phase shifter configured to shift a phase of the second control signal output from the balancing controller and output a phase-shifted control signal,
wherein one of the two sub-circuits directly receives the first control signal output from the balancing controller, and a remaining sub-circuit receives the phase-shifted control signal from the phase shifter, and
wherein the balancing controller is further configured to:
subtract a value of the inductor current of the one sub-circuit from a value of the inductor current of the remaining sub-circuit to obtain a difference value,
amplify the difference value at one predetermined amplifying ratio;
add a value which is obtained by integrating the amplified value at the one predetermined amplifying ratio to a value amplified at another predetermined amplifying ratio in order to obtain a duty-ratio difference value,
multiply the duty ratio of the control signal output from the current controller by a value which is obtained by subtracting the duty-ratio difference value from '1' in order to apply a multiplying result to the one sub-circuits as the first control signal output from the balancing controller, and
multiply the duty ratio of the control signal output from the current controller by a value which is obtained by adding the duty-ratio difference value to '1' in order to apply a multiplying result to the remaining sub-circuit as the second control signal output from the balancing controller.

6. The two-phase interleaved converter of claim 5, wherein the balancing controller reduces the duty ratio of the first control signal applied to the one sub-circuit when the inductor current of the one sub-circuit is greater than an inductor current of the remaining sub-circuit.

7. The two-phase interleaved converter of claim 5, wherein the balancing controller increases the duty ratio of the first control signal applied to the one sub-circuit when the inductor current of the one sub-circuit is less than an inductor current of the remaining sub-circuit.

8. The two-phase interleaved converter of claim 5, wherein the phase shifter shifts the phase of the second control signal output from the balancing controller by 180°.

9. A method of controlling a two-phase interleaved converter, the method comprising:
sensing inductor current values of two sub-circuits of the two-phase interleaved converter;
calculating, by a balancing controller, a difference between the inductor current values of the two sub-circuits; and
increasing, by the balancing controller, a duty ratio of a first control signal applied to one of the two sub-circuits when one inductor current value of the one sub-circuit is less than a remaining inductor current value of a remaining sub-circuit,
wherein the balancing controller is further configured to:
subtract the value of the inductor current of the one sub-circuit from the value of the inductor current of the remaining sub-circuit to obtain a difference value,
integrate the difference value to obtain a duty-ratio difference value,
multiply a duty ratio of a control signal output from a current controller by a value which is obtained by subtracting the duty-ratio difference value from '1' in order to apply a multiplying result to the one sub-circuit as the first control signal output from the balancing controller, and
multiply the duty ratio of the control signal output from the current controller by a value which is obtained by adding the duty-ratio difference value to '1' in order to apply a multiplying result to the remaining sub-circuit as the second control signal output from the balancing controller.

10. A method of controlling a two-phase interleaved converter, the method comprising:
sensing inductor current values of two sub-circuits of the two-phase interleaved converter;
calculating, by a balancing controller, a difference between the inductor current values of the two sub-circuits; and
increasing, by the balancing controller, a duty ratio of a first control signal applied to one of the two sub-circuits when one inductor current value of the one sub-circuit is less than a remaining inductor current value of a remaining sub-circuit,
wherein the balancing controller is further configured to:
subtract the value of the inductor current of the one sub-circuit from the value of the inductor current of the remaining sub-circuit to obtain a difference value,
amplify the difference value at one predetermined amplifying ratio;
add a value which is obtained by integrating the amplified value at the one predetermined amplifying ratio to a value amplified at another predetermined amplifying ratio in order to obtain a duty-ratio difference value,
multiply a duty ratio of a control signal output from a current controller by a value which is obtained by subtracting the duty-ratio difference value from '1' in order to apply a multiplying result to the one sub-circuit as the first control signal output from the balancing controller, and
multiply the duty ratio of the control signal output from the current controller by a value which is obtained by adding the duty-ratio difference value to '1' in order to apply a multiplying result to the remaining sub-circuit as a second control signal output from the balancing controller.

11. A method of controlling a two-phase interleaved converter, the method comprising:
sensing inductor current values of two sub-circuits of the two-phase interleaved converter;
calculating, by a balancing controller, a difference between the inductor current values of the two sub-circuits; and
reducing, by the balancing controller, a duty ratio of a first control signal applied to one of the two sub-circuits when one inductor current value of the one sub-circuit is greater than a remaining inductor current value of a remaining sub-circuit,
wherein the balancing controller is further configured to:
subtract the value of the inductor current of the one sub-circuit from the value of the inductor current of the remaining sub-circuit to obtain a difference value,
integrate the difference value to obtain a duty-ratio difference value,
multiply a duty ratio of a control signal output from a current controller by a value which is obtained by subtracting the duty-ratio difference value from '1' in order to apply a multiplying result to the one sub-circuit as the first control signal output from the balancing controller, and
multiply the duty ratio of the control signal output from the current controller by a value which is obtained by adding the duty-ratio difference value to '1' in order to apply a multiplying result to the remaining sub-circuit as a second control signal output from the balancing controller.

12. A method of controlling a two-phase interleaved converter, the method comprising:
sensing inductor current values of two sub-circuits of the two-phase interleaved converter;
calculating, by a balancing controller, a difference between the inductor current values of the two sub-circuits; and
reducing, by the balancing controller, a duty ratio of a first control signal applied to one of the two sub-circuits when one inductor current value of the one sub-circuit is greater than a remaining inductor current value of a remaining sub-circuit,
wherein the balancing controller is further configured to:
subtract the value of the inductor current of the one sub-circuit from the value of the inductor current of the remaining sub-circuit to obtain a difference value,
amplify the difference value at one predetermined amplifying ratio;
add a value which is obtained by integrating the amplified value at the one predetermined amplifying ratio to a value amplified at another predetermined amplifying ratio in order to obtain a duty-ratio difference value, multiply a duty ratio of a control signal output from a current controller by a value which is obtained by subtracting the duty-ratio difference value from '1' in order to apply a multiplying result to the one sub-circuit as the first control signal output from the balancing controller, and multiply the duty ratio of the control signal output from the current controller by a value which is obtained by adding the duty-ratio difference value to '1' in order to apply a multiplying result to the remaining sub-circuit as a second control signal output from the balancing controller.

* * * * *